Jan. 23, 1962     A. R. GOELLNER     3,018,322
ELECTRODE PROBE
Filed April 28, 1960

INVENTOR.
ALLAN R. GOELLNER
BY Woodling & Krost
ATTORNEYS

United States Patent Office 3,018,322
Patented Jan. 23, 1962

3,018,322
ELECTRODE PROBE
Allan R. Goellner, Parma Heights, Ohio, assignor to Reliance Gauge Column Co.
Filed Apr. 28, 1960, Ser. No. 25,456
11 Claims. (Cl. 174—151)

The invention relates generally to an electrode probe assembly and more particularly to an electrical probe which may be used in high temperature and high pressure applications.

Electrical probes have been used in liquid containing vessels to determine the level of liquid in the vessel and have previously been used in steamboilers and other steam vessels. However, it is quite well known that even pure water becomes quite corrosive under high temperature conditions and it has been found that glass, which is normally considered to be a good insulator, is about half eaten away in one day at 1500 pounds per square inch of steam pressure which has a consequential temperature of about 600° F. Accordingly, glass ceramic and porcelain insulators have been unsuccessfully tried in the higher temperature and pressure ranges as insulators in electrode probe assemblies.

Accordingly, an object of the invention is to provide an electrode probe assembly usable in higher pressure and temperature steam applications.

Still another object of the invention is to provide an electrode probe which does not utilize any glass, ceramic or porcelain materials in locations subjected to high temperature water or steam.

Still another object of the invention is to provide a high pressure electrode probe assembly which successfully resists extrusion of the probe rod from the probe assembly.

Still another object of the invention is to provide a probe assembly using an insulator which is plastic, and hence, capable of extrusion to a certain degree.

Another object of the invention is to provide an electrode probe assembly which subjects the insulator primarily to a compression force which subjects the insulator to an extrusion action and the compression of the insulator by a certain amount increasingly resists the extrusion action.

Figure 1:
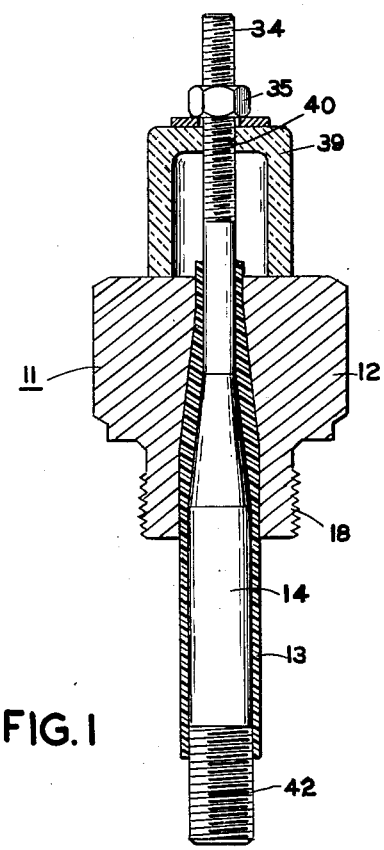
Figure 2:
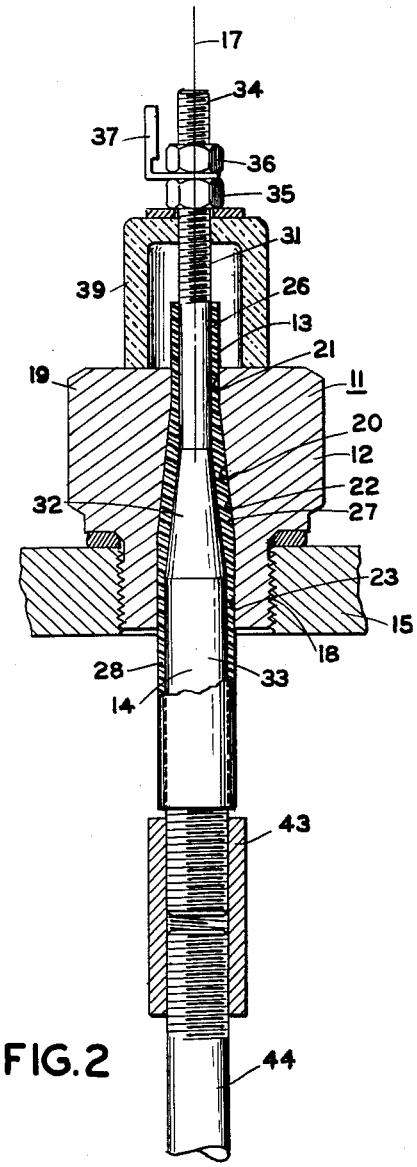

Other objects and a fuller understanding of this invention may be had by referring to the following description and claims, taken in conjunction with the accompanying drawing, in which:

FIGURE 1 is a longitudinal sectional view of an electrode probe assembly embodying the invention prior to complete assembly; and FIGURE 2 is a longitudinal sectional view of the probe after complete assembly.

The figures of the drawing show the complete electrode probe assembly 11 which includes generally a metal body 12, an insulator sleeve 13 and a central probe rod 14. The metal body 12 is formed of some metal suitable for the probe, such as bronze or preferably stainless steel to resist corrosion under action of high temperature steam. The body 12 has a longitudinal axis 17 and the inner end 18 of the body has male threads for threaded engagement in an aperture in a steam vessel 15, such as a steam boiler or associated water chamber. The outer end 19 of the body 12 may be hexagonal in shape, for example, for a wrench pad. The body 12 has an axial surface 20 defining an aperture which has first, second and third aperture portions 21, 22 and 23, respectively. The first and third aperture portions 21 and 23 are cylindrical and are joined by the conical second portion 22 at smooth junctions. The first aperture portion 21 has a smaller diameter than the third portion 23 and is at the outer end 19 of the body 12.

The insulator sleeve 13 may be made from a suitable material and one such material is a fluorocarbon resin. More specifically the material may be polytetrafluoroethylene, a synthetic resinous fluorine-containing polymer or a polymer of fluorinated hydrocarbons. One such commercially available and satisfactory material is that sold under the trademark "Teflon" by Du Pont. This insulator sleeve 13 has first, second and third portions 26, 27 and 28, respectively, with the first and third portions 26 and 28 having cylindrical inner and outer surfaces and the second portion 27 being tapered both on the inner and outer surfaces. The central probe rod 14 is of metal of a suitable type, such as bronze or preferably stainless steel to resist the corrosive action of the high temperature steam. This probe rod 14 has first, second and third portions 31, 32 and 33, respectively, with the first and third portions 31 and 33 being cylindrical and the second portion 32 being conical and tapering to smoothly merge with the first and third portions 31 and 33. The outer end of the first probe rod portion 31 is threaded at 34 to receive a nut 35 and a lock nut 36 which may lockingly engage a terminal 37. A stand-off insulator 39 of porcelain or other suitable material has a generally inverted cup shape with an axial aperture 40 surrounding the probe rod outer portion 31 and with the rim of the cup acting against the outer end of the body 12.

The insulator sleeve may be molded or otherwise formed into the shape shown in FIGURE 1. This is the unstressed condition and shape of this insulator sleeve. As such the first sleeve portion 26 extends axially outwardly from the body 12 only a small amount. The third sleeve portion 28 preferably extends for a considerable distance along the probe rod inner portion 33. The inner end of this probe rod inner portion 33 has a threaded end 42 and a threaded coupling 43 may be received thereon to join with extension rods 44 of any desired length. The length of the extension rods may be chosen to reach into the steam vessel a desired amount so as to determine liquid levels at different elevations.

In the unstressed state of the insulator sleeve 13, as shown in FIGURE 1, the wall thickness of the first and third sleeve portions 26 and 28 is approximately $\frac{1}{32}$ of an inch. The wall thickness of the tapered second portion 27 is approximately $\frac{1}{16}$ of an inch. The radial spacings between the body 12 and the probe rod 14 at the different portions also conforms substantially to the thickness of the insulator sleeve at the respective points so that the body 12, the sleeve 13 and the probe 14 are all in contact. The diameter of the rod inner portion 33 may be $\frac{1}{4}$ of an inch, for example, and the diameter of the rod outer portion 31 may be $\frac{1}{8}$ of an inch. With these dimensions and proportions it will be noted that the diameter of the rod inner portion 33 is greater than the inside diameter of the aperture first portion 21 in the outer end of the body 12. Accordingly, it is impossible for the rod 14 to be extruded outwardly through the aperture 20 by an axially outward force such as is caused by high pressure steam within the vessel 15.

During assembly of the probe 11 the parts are assembled as shown in FIGURE 1 and then the body 12 is threaded into a pressure chamber which subjects the inner end of the probe rod 14 to a hydrostatic test pressure of 5000 pounds per square inch. This pressure exerts an axially outward force on the probe rod 14, and accordingly, it moves outwardly because the sleeve 13 is plastic in the technical sense. This axial force on the sleeve 13 extrudes the first portion 26 of the sleeve outwardly along the first portion 31 of the rod. Accordingly, this first sleeve portion 26 is much elongated as shown in comparing FIGURES 1 and 2. The tapered sleeve portion 27 reduces somewhat in thickness, but it has been found that with the proportions and dimensions used this tapered sleeve portion is not reduced to a wall thickness which is as small as the wall thickness of the sleeve first portion 26. It has been found that the more a plastic material is extruded under a compressive force, the harder it becomes to extrude still further. Accordingly, the present design has a builtin safety factor and this axial compressive force on the rod 14 and on the tapered sleeve portion 27 is resisted by the inherent compressive strength of the insulator sleeve 13. While the pressure is still being exerted on the inner end of the rod 14 the nut 35 is tightened down against the standoff insulator 39. Therefore, this nut acting through the standoff insulator onto the body 12 maintains an axial outward force on the rod 14 relative to the body 12 so as to maintain the tapered sleeve portion 27 under an axially compressive force. Accordingly, the nut 35 and the standoff insulator 39 are insulator means to maintain an axially outward force on the rod 14.

The angle of the conical aperture portion 22 and the conical probe rod portion 32 is approximately seven degrees which provides a smooth merger with the larger and smaller cylindrical portion of the body 12 and the rod 14 and yet permits the inside diameter of the aperture 20 at the outer end of the body 12 to be smaller than the inner probe rod portion 33 without excessive length of the body 12 and yet this conical angle is not so great as to subject the insulator sleeve to any appreciable shearing action.

The terminal 37 may be connected to a conductor and an electrical potential difference applied between the rod 14 and the body 12 of the vessel 15. This may be in the order of 250 volts, for example, and when the rod extension 44 is in contact with the water in the vessel there will be completed an electrical circuit which may be used for alarm or indicating purposes in a well-known manner. When the rod extension 44 is not in contact with the water, but only in contact with steam, then there will be a much greater electrical resistance between the body 12 and the probe rod 14 which will establish an effectively open circuit condition for a second alarm or indicating condition in the external circuit. The length of the sleeve third portion 28 is sufficient along the rod third portion 33 to provide good insulation between the body 12 and the probe rod 14. It has been found that the present probe 11 may be used with much higher steam pressures and much higher steam temperatures than probes heretofore used and the insulator material has been found to be satisfactory up to about 550° F. which is about 1100 pounds per square inch working steam pressure. This probe under these conditions is satisfactory for 250 volts working voltage with ease and it has been found that it will withstand a 4000 volt breakdown test.

In actual practice, the probe rod 14 has been made with a slightly roughened tapered portion 32 in order to eliminate as much as possible any axial slippage between the probe rod and the interior surface of the sleeve 13 at this tapered portion. One convenient way of providing this roughening is to leave it rough from the machining operation, such as is caused by a sharp pointed tool performing a taper cut.

Although this invention has been described in its preferred form with a certain degree of particularity, it is understood that the present disclosure of the preferred form has been made only by way of example and that numerous changes in the details of construction and the combination and arrangement of parts may be restorted to without departing from the spirit and the scope of the invention as hereinafter claimed.

What is claimed is:

1. An electrode probe assembly comprising, in combination, a body, a tapered aperture in said body having inner and outer ends with the inner end being larger, a plastic insultor sleeve having inner and outer surfaces with said outer surface disposed in said aperture and in engagement therewith, a metal probe rod having a tapered portion in engagement with the inner surface of said sleeve and extending outwardly from said body aperture, the diameter of the larger inner end of said rod tapered portion exceeding the inside diameter of the outer end of said body aperture to positively prevent extrusion of said rod outwardly through said body aperture, said sleeve between said tapered body aperture and rod portion having an uncompressed thickness in the order of twice the radial spacing between said rod and said body aperture outer end, and means to maintain an axially outward force on said rod relative to said body to maintain axially compressed said sleeve.

2. An electrode probe assembly comprising, in combination, a body, a tapered aperture in said body having inner and outer ends with the inner end being larger, a plastic insulator sleeve having tapered inner and outer surfaces with said outer surface disposed in said aperture in engagement therewith, a metal probe rod having first and second portions with said second portion being tapered and in engagement with the inner surface of said sleeve, said first portion extending outwardly from said body aperture, the diameter of the larger inner end of said rod tapered portion exceeding the inside diameter of the outer end of said body aperture to positively prevent extrusion of said rod outwardly through said body aperture, a majority of said, tapered sleeve having a given uncompressed wall thickness, said rod being spaced from said body aperture at said outer end a given radial dimension approximately half the uncompressed wall thickness of the majority of said tapered sleeve, said insulator sleeve being axially compressed by an axially outward force on said rod to extrude said sleeve outwardly along the first rod portion and to reduce the wall thickness of said sleeve between said tapered aperture and said tapered rod portion to a wall thickness which is still greater than said given radial dimension, and means acting between said rod first portion and said body to maintain an axially outward force on said rod to maintain said sleeve in the axially compressed condition.

3. An electrode probe assembly comprising, in combination, a body, a tapered aperture in said body having inner and outer ends with the inner end being larger, a plastic insulator sleeve having tapered inner and outer surfaces with said outer surface disposed in said aperture in engagement therewith, a metal probe rod having first and second portions with said second portion being tapered and in engagement with the inner surface of said sleeve, said first portion extending outwardly from said body aperture, the diameter of the larger inner end of said rod tapered second portion exceeding the inside diameter of the outer end of said body aperture to positively prevent extrusion of said rod outwardly through said body aperture, said insulator sleeve initially having a given wall thickness, but after subjection of an axial outward force on said probe rod the said rod moves outwardly and the said sleeve extrudes outwardly along the first rod portion and is reduced in wall thickness by up to 50% and the remaining thickness being sufficient to resist an axial outward force on said rod of 5000 p.s.i. and sufficient to withstand a voltage breakdown test of 2000 volts, and insulated means acting between the outer end of said rod and said body to retain said rod in the outward position to retain said sleeve in the axially compressed condition.

4. An electrode probe assembly comprising, in combination, a metal body, a tapered aperture in said body having inner and outer ends with the outer end being the smaller diameter, a plastic insulator sleeve having inner and outer surfaces with said outer surface in engagement with said aperture, a metal probe rod having a tapered portion in engagement with the inner surface of said sleeve, a standoff insulator having an axial aperture surrounding the outer end of said probe rod, the outer end of said rod being threaded, the diameter of said rod tapered portion at the inner end of said body aperture exceeding the inside diameter of said body aperture outer end to positively prevent extrusion of said rod outwardly through said body aperture, said insulator sleeve initially having a wall thickness of approximately $\frac{1}{16}$ of an inch, but after subjection of an axial outward force on said probe rod the said sleeve extrudes outwardly beyond said body and is reduced in wall thickness to an amount between $\frac{1}{16}$ and $\frac{1}{32}$ of an inch, and a nut tightened down against said standoff insulator to retain said rod in this outward position.

5. An electrode probe assembly comprising, in combination, a metal body, a tapered aperture in said body having inner and outer ends with the outer end being the smaller diameter, a plastic insulator sleeve having tapered inner and outer surfaces and with said outer surface disposed in said aperture in engagement therewith, a metal probe rod having an outer first cylindrical portion and having a tapered second portion in engagement with the inner surface of said sleeve, a standoff porcelain insulator of a generally cup shape and having an axial aperture surrounding the outer first portion of said probe rod, said first portion of said rod being threaded, the diameter of the inner end of said rod second portion exceeding the inside diameter of said body aperture outer end to positively prevent extrusion of said rod outwardly through said body aperture,, said insulator sleeve initially having a wall thickness of approximately $\frac{1}{16}$ of an inch, but after subjection of an axial outward force on said probe rod the said sleeve extrudes outwardly along the first rod portion and said sleeve is reduced in wall thickness to an amount between $\frac{1}{16}$ and $\frac{1}{32}$ of an inch, and a nut tightened down against said standoff insulator to retain said rod in this outward position.

6. An electrode probe assembly comprising, in combination, a metal body having inner and outer ends and adapted for mounting in a high pressure steam vessel, an aperture in said body having inner and outer ends, first and second portions in said aperture positioned in that order from the outer to the inner end, said second portion being generally tapered and the inner end thereof having a larger diameter than the outer end thereof, said first and second portions smoothly merging, a plastic insulator sleeve disposed in said aperture and having first and second portions and the outer surfaces thereof being in engagement with said first and second portions, respectively, of said body aperture, a metal probe rod having first and second portions in engagement with the inside surfaces of said first and second sleeve portions, respectively, a standoff porcelain insulator of a generally cup shape and having an axial aperture surrounding the outer first portion of said probe rod, said first portion of said rod being threaded, the diameter of the larger inner end of said rod second portion exceeding the inside diameter of said body aperture first portion to positively prevent extrusion of said rod outwardly through said body aperture, said insulator sleeve first portion having a wall thickness of approximately $\frac{1}{32}$ of an inch and said second sleeve portion initially having a wall thickness of approximately $\frac{1}{16}$ of an inch, but after subjection of an axial outward force on said probe rod the said first sleeve portion extrudes outwardly along the first rod portion and said second sleeve portion is reduced in wall thickness to an amount between $\frac{1}{16}$ and $\frac{1}{32}$ of an inch, and a nut tightened down against said standoff insulator to retain said rod in this outward position.

7. An electrode probe assembly comprising, in combination, a metal body having an axis and an inner and outer end and adapted for mounting in a high pressure steam vessel, an aperture in said body having inner and outer ends, first, second and third portions in said aperture positioned in that order from the outer to the inner end and with said third portion having a larger diameter than said first portion, said second portion being generally tapered and smoothly merging with said first and third portions, a plastic insulator sleeve disposed in said aperture and having first, second and third portions and the outer surfaces thereof being in engagement with said first, second and third portions, respectively, of said body aperture, a metal probe rod having first, second and third portions in engagement with the inside surfaces of said first, second and third sleeve portions, respectively, said first portion of said rod being threaded, the diameter of said rod third portion exceeding the inside diameter of said body aperture first portion to positively prevent extrusion of said rod outwardly through said body aperture, a standoff porcelain insulator of a generally cup shape and having an axial aperture surrounding the outer first portion of said probe rod, said insulator sleeve first and third portions having a wall thickness of approximately $\frac{1}{32}$ of an inch and said second sleeve portion initially having a wall thickness of approximately $\frac{1}{16}$ of an inch, but after subjection of an axial outward force on said probe rod the said first sleeve portion extrudes outwardly along the first rod portion and said second sleeve portion is reduced in wall thickness to an amount between $\frac{1}{16}$ and $\frac{1}{32}$ of an inch, and a nut tightened down against said standoff insulator to retain said rod in this outward position.

8. An electrode probe assembly for high pressure steam applications comprising, in combination, a metal body having an axis and an inner and outer end, male threads on said inner end adapted for threaded engagement with an aperture in a high pressure steam vessel, a conical axial aperture in said body, said conical aperture having a taper of approximately seven degrees and tapering to a smaller diameter at the outer end of said body, a conical plastic insulator sleeve disposed in said aperture and having a taper approximately that of said conical aperture, a metal probe rod having an outer first cylindrical portion and a second conical portion, said second rod portion being in engagement with the inside surface of said sleeve, the diameter of the inner end of said rod conical second portion exceeding the inside diameter of said body aperture outer end to positively prevent extrusion of said rod outwardly through said body aperture, a standoff porcelain insulator of a generally cup shape and having an axial aperture surrounding the outer first portion of said probe rod, said first portion of said rod being threaded, a nut engaging said threaded rod portion and bearing against said standoff insulator, said insulator sleeve initially having a wall thickness of approximately $\frac{1}{16}$ of an inch, but after subjection of an axial outward force on said probe rod the said sleeve extrudes outwardly along the first rod portion and is reduced in wall thickness to an amount between $\frac{1}{16}$ and $\frac{1}{32}$ of an inch, and said nut being tightened down against said standoff insulator to retain said rod in this outward position.

9. An electrode probe assembly for high pressure steam applications comprising, in combination, a metal body having an axis and an inner and outer end, male threads on said inner end adapted for threaded engagement with an aperture in a high pressure steam vessel, an axial aperture in said body, first and second portions in said axial aperture with said first portion being cylindrical and said second portion being conical, said conical second portion having a taper of approximately seven degrees and said first portion being at the outer end of said body and having a diameter less than the diameter of the inner end of said conical second portion, a plastic insulator sleeve disposed in said aperture and having first and second portions, said first portion being cylindrical and said second portion being conical with a taper approximately that of said conical aperture portion, the outer surface of said first and second sleeve portions being in engagement with said first and second portions, respecporcelain insulator of a generally cup shape and having first and second portions in engagement with the inside surfaces of said first and second sleeve portions, respectively, said first rod portion being cylindrical and said second rod portion being conical and with a taper approximately that of said conical sleeve portion, a standoff porcelain insulator of a generally cup shape and having an axial aperture surrounding the outer first portion of said probe rod, said first portion of said rod being threaded, a nut engaging said threaded rod portion and bearing against said standoff insulator, the diameter of the inner end of said rod conical second portion exceeding the inside diameter of said body aperture first portion to positively prevent extrusion of said rod outwardly through said body aperture, said sleeve first portion having a wall thickness of approximately $\frac{1}{32}$ of an inch and said second sleeve portion initially having a wall thickness of approximately $\frac{1}{16}$ of an inch, but after subjection of an axial outward force on said probe rod the said first sleeve portion extrudes outwardly along the first rod portion and said second sleeve portion is reduced in wall thickness to an amount between $\frac{1}{16}$ and $\frac{1}{32}$ of an inch, and said nut being tightened down against said standoff insulator to retain said rod in this outward position.

10. An electrode probe assembly for high pressure steam applications comprising, in combination, a stainless steel body having an axis and an inner and outer end, male threads on said inner end adapted for threaded engagement with an aperture in a steam boiler, an axial aperture in said body, first, second and third portions in said axial aperture positioned in that order and with said first and third portions being cylindrical and said second portion being conical, said conical second portion having a taper of approximately seven degrees and said first portion being at the outer end of said body and having a diameter less than the diameter of said third portion, a plastic insulator sleeve disposed in said aperture and having first, second and third portions, said first and third portions being cylindrical and said second portion being conical with a taper matching that of said conical aperture portion, the outer surface of said first, second and third sleeve portions being in engagement with said first, second and third portions, respectively, of said body aperture, a probe rod of stainless steel having first, second and third portions in engagement with the inside surface of said first, second and third sleeve portions, respectively, said first and third rod portions being cylindrical and said second rod portion being conical and with a taper matching that of said conical sleeve portion, a standoff porcelain insulator of a generally cup shape and having an axial aperture surrounding the outer first portion of said probe rod, said first portion of said rod being threaded, a nut engaging said threaded rod portion and bearing against said standoff insulator, the diameter of said rod third portion exceeding the inside diameter of said body aperture first portion to positively prevent extrusion of said rod outwardly through said body aperture, said sleeve first and third portions having a wall thickness of $\frac{1}{32}$ of an inch and said second sleeve portion initially having a wall thickness of $\frac{1}{16}$ of an inch, but after subjection of an axial outward force on said probe rod the said first sleeve portion extrudes outwardly along the first rod portion and said second sleeve portion is reduced in wall thickness to an amount between $\frac{1}{16}$ and $\frac{1}{32}$ of an inch, and said nut being tightened down against said standoff insulator to retain said rod in this outward position.

11. An electrode probe assembly comprising, in combination, a body, a tapered aperture in said body having inner and outer ends with the inner end being larger, a plastic insulator sleeve having tapered inner and outer surfaces with said outer surface disposed in said aperture in engagement therewith, a metal probe rod having first and second portions with said second portion being tapered and in engagement with the inner surface of said sleeve, said first portion extending outwardly from said body aperture, the diameter of the larger inner end of said rod tapered second portion exceeding the inside diameter of the outer end of said body aperture to positively prevent extrusion of said rod outwardly through said body aperture, said insulator sleeve initially having a given wall thickness, but after subjection of an axial outward force on said probe rod the said rod moves outwardly and the said sleeve extrudes outwardly along the first rod portion and is materially reduced in wall thickness, and means to retain said rod in the outward position to retain said sleeve in the axially compressed condition.

References Cited in the file of this patent
UNITED STATES PATENTS

| | | |
|---|---|---|
| 2,616,949 | Cade | Nov. 4, 1952 |
| 2,651,672 | Ivanoff | Sept. 8, 1953 |
| 2,945,914 | Aamodt | July 19, 1960 |

OTHER REFERENCES

Klein: German printed application 1,029,065, Apr. 30, 1958.